United States Patent [19]

Howell

[11] Patent Number: 5,187,502
[45] Date of Patent: Feb. 16, 1993

[54] PILOT'S VISOR

[76] Inventor: Joe D. Howell, 107 Raven Rd., Greenville, S.C. 29615

[21] Appl. No.: 757,280

[22] Filed: Sep. 10, 1991

[51] Int. Cl.$^5$ ............................................. G02C 7/10
[52] U.S. Cl. .................................... 351/44; 351/57; 2/6
[58] Field of Search ...................... 351/44, 47, 57, 43, 351/158; 2/6; 1/430

[56] References Cited

U.S. PATENT DOCUMENTS

| | | | |
|---|---|---|---|
| 4,181,405 | 1/1980 | Cohen | 2/6 |
| 4,217,037 | 8/1980 | Lemelson | 351/44 |
| 4,717,249 | 1/1988 | Fischer | 351/43 |

Primary Examiner—Bruce Y. Arnold
Assistant Examiner—Hung Xuan Dang
Attorney, Agent, or Firm—Richard C. Litman

[57] ABSTRACT

A visor particularly useful by pilots includes a unitary, arcuate, molded transparent member having a lower edge closely conforming to the cheekbone area and bridge of the nose of a user's face. While maintaining a head's up attitude, the pilot's eyes may scan outside the cockpit, the panel instruments and also view a kneeboard. In the latter instance, farsightedness is overcome through the inclusion of a pair of contoured lenses flushly affixed to the inner surface of the visor, juxtaposed a cut-out engaging the wearer's nose. In view of the compound curvature of the visor, it is readily adapted for use with an aviator's helmet, with the added lenses on the inner visor surface avoiding interference with retraction of the visor into the helmet shell. Optionally, by the addition of separable fastener devices adjacent the two lateral extremes of the visor, a protective cover member may be removably attached in an overlying manner, upon the outer surface of the visor.

19 Claims, 2 Drawing Sheets

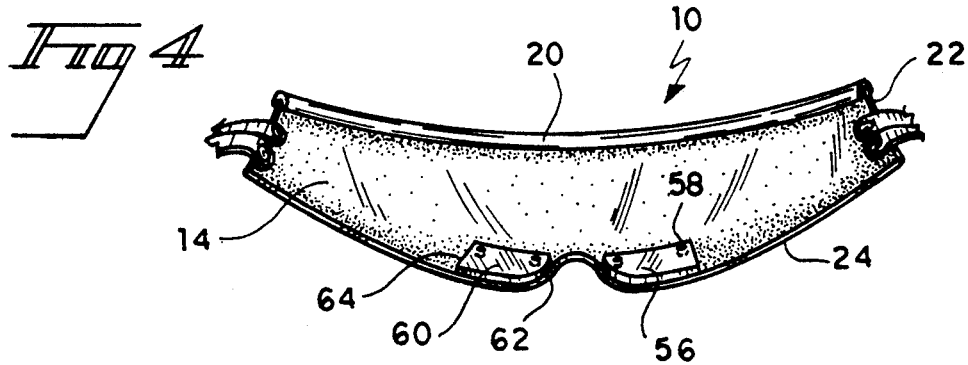
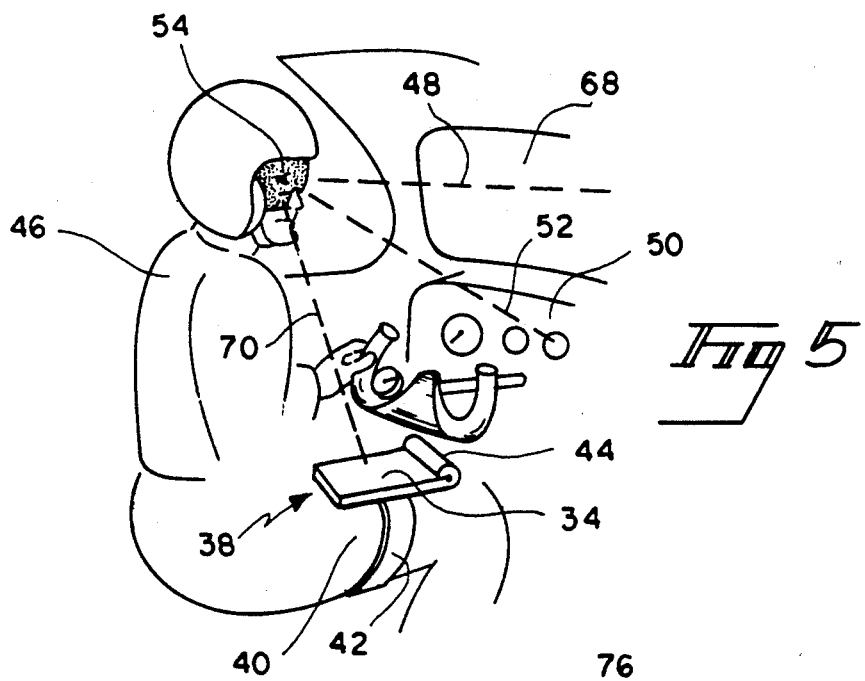
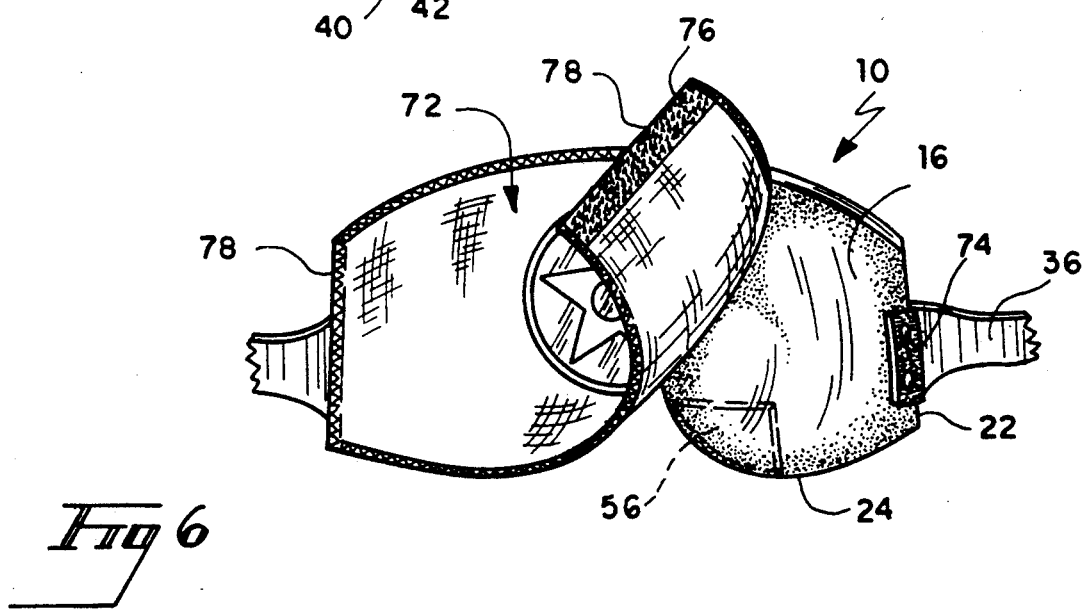

PILOT'S VISOR

FIELD OF THE INVENTION

This invention relates generally to visors and more particularly, to an improved visor including corrective lens segments specifically located to accommodate the requirements of aircraft pilots.

BACKGROUND OF THE INVENTION

The use of various types of protective gear for aircraft pilots is well known, particularly for the head and eyes. Helmets and goggles have been used since the first open cockpit aircraft went into production. In the case of military aircraft, both rotary and fixed wing, pilots are required to wear a prescribed helmet, such as the model HGU-33 helmet and which includes one or more attached visors. These visors, which may be of various tints, are attached to the helmets in a manner permitting the raising and lowering thereof between stowed and use positions. The primary function of such visors is to protect the pilot's eyes from glare or sunlight and since military pilots are required to have near perfect uncorrected vision, the visors naturally exhibit no refraction. In the case of civilian pilots, the government's requirements for a pilot's eyesight are far less stringent and accordingly, many civilian pilots possess currently valid medical certificates and pilot licenses although some corrective eyeglasses may be required or, at least would facilitate the pilot's flying of an aircraft. For example, many pilots utilize a kneeboard while flying. Such devices are a common accessory and comprise a planar support member including a resilient clip for retaining flight charts, approach plates or the like and which is strapped or otherwise affixed to the user's thigh. In this manner, critical flight information publications are readily accessible and the pilot has literally at their fingertips, a writing tablet upon which to record radio frequencies, course assignments and other instructions as received from air traffic control.

Many pilots suffer from farsightedness, to a degree that close-up reading of the instrument panel and printed data requires corrective lenses. Typically, the kneeboard on the upper part of a pilot's thigh is less than two feet from their eyes and to view it with bi-focal or tri-focal eyeglasses, the wearer must slightly bow their head. The need exists for means whereby a pilot, without wearing eyeglasses and through use of his visor, may immediately have visual access to their kneeboard and the panel instruments with little or no head movement and with the aid of corrective lenses associated with the visor. With such an arrangement, a pilot requiring corrective optics, can avoid the awkward task of inserting glasses behind a helmet's visor and may even eliminate the need for carrying eyeglasses into the cockpit.

DESCRIPTION OF THE RELATED ART

It is generally well known to combine eyeglasses with a shield or shading device. U.S. Pat. No. 3,276,035 issued to Jacobson discloses a visor or shield removably attachable atop conventional eyeglasses. In the case of U.S. Pat. No. 4,815,838 issued to Liautaud, protective eyeshields are snap-fittedly connected to a visor in the form of a bill. The broad concept of combining optical lenses with cap or visor devices is shown in U.S. Pat. No. 4,839,926 issued to Choi and which depicts the attachment of binoculars adjacent the bill of headgear.

None of the above acknowledged prior art devices are seen to suggest the unique arrangement now being proposed and wherein a compound contoured, eye-covering transparent visor is provided with strategically located corrective lenses permitting a pilot to maintain heads-up flying, including full visual access to the area of a kneeboard.

SUMMARY OF THE INVENTION

By the present invention, improved eyewear especially adapted for use by pilots is provided and which includes a unitary, compound curved transparent member suitably tinted to offer the desired eye protection in a pilot's environment. To permit maintenance of a heads-up attitude while flying, yet allow the pilot to gaze downwardly to clearly view a kneeboard and the aircraft instruments, lenses offering close visual acuity are mounted upon the inner surface of the visor. By placement of these lenses contiguous with the lower edge of the visor and adjacent a nose bridge cut-out, the lenses will be directly within the line of sight when the user drops their gaze down to their thigh where the kneeboard is attached. The visor is usable with any of the standard aviator's helmets wherein a thumb screw type of actuating member is selectively slidable through a slot in the helmet shell to raise and lower the visor or, it may be worn with adjustable straps in the fashion of goggles. To shield the outer surface of the visor when not being worn or retracted within a helmet, a protective cover having fastener members at its opposite ends, may be releasably affixed to mating fastener members on the visor.

Accordingly, one of the objects of the present invention is to provide an improved visor having supplemental optical elements specifically located to permit maintenance of a user's heads-up attitude while allowing visual acuity not only in a forward direction but also at a steep downward angle which is at a closer range.

Another object of the present invention is to provide an improved visor particularly adapted for use by pilots wherein optical enhancement is desired to focus upon a kneeboard or aircraft panel located at relatively close range upon the user's thigh, without requiring displacement of the head from a heads-up attitude.

A further object of the present invention is to provide an improved visor including a preferably tinted member of compound curvature having a pair of lenses affixed in the inner surface, immediately adjacent a lower edge and juxtaposed a nose bridge cut-out.

Still another object of the present invention is to provide an improved visor adapted for use with an aviator's helmet and having supplemental optical elements not interfering with displacement of the visor between use and stowage positions within the helmet.

Another object of the present invention is to provide an improved visor containing affixed corrective lenses and having a curvature presenting a perimeter closely mating with the user's face, from the forehead to the under-eye area and over the nose bridge and wherein the outer surface is protected when not being used, by a removably attachable flexible cover.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 4 is a bottom plan view of the visor;

FIG. 5 is a side elevation of the visor in use; and

FIG. 6 is a front elevation depicting the use of a removably attachable protective cover with the visor of this invention.

Similar reference characters designate corresponding parts throughout the several figures of the drawings.

DESCRIPTION OF THE PREFERRED EMBODIMENT

Figure 1:
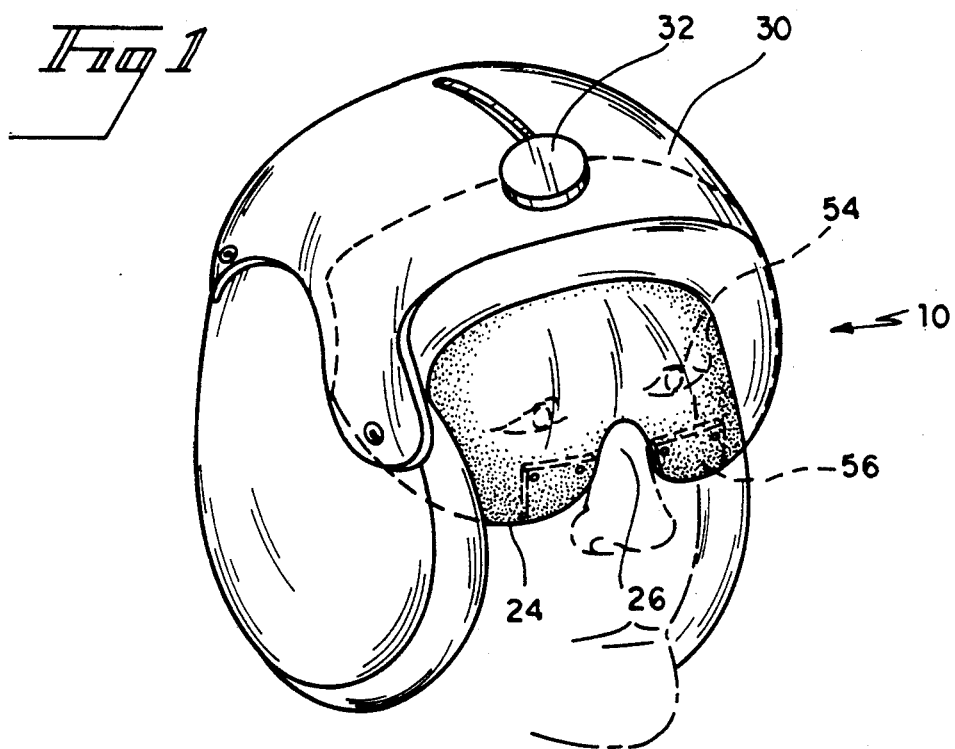
FIG. 1 is a perspective view of the visor as employed with an aviator's helmet.
Figure 2:
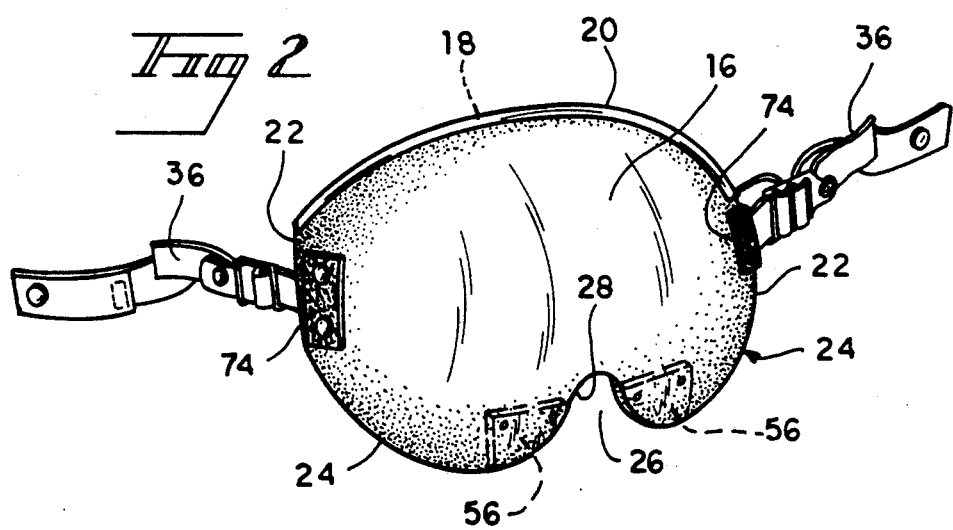
FIG. 2 is a front perspective view of the visor with lateral attachment members.

Referring now to the drawings, the present invention will be seen to comprise a visor, generally designated 10 and which is constructed in a manner particularly adapting it for use by pilots utilizing an aviator's helmet. To provide protection to a user's eyes, both against glare and sunlight as well as wind, the visor is formed to provide a periphery 12 that offers substantially full contact with the user's face while precluding interference between one's eyelashes and the visor inner surface 14.

Accordingly, the visor body will be seen to comprise a bulbous formation wherein the outer surface 16 defines a convex configuration, along both its vertical and horizontal axes. The periphery 12 includes a slightly curved top or forehead edge 18 which preferably includes a cushion strip 20 to aid in protecting the wearer should he or she suffer an impact upon the visor. Substantially vertical side edges 22,22 are positioned to be disposed slightly spaced from the user's temples and communicate with bottom or cheek edges 24,24 adapted to engage the fleshy portion of one's face, in the upper region of the cheeks, below the eyes. The two bottom edges 24 are interrupted by a medial relief area forming a nose bridge cut-out 26 as defined by a visor nose peripheral edge 28 closely conforming to a wearer's nose bridge. In this manner, substantially full contact of particularly the lower visor periphery will be provided when the visor is in its use position, such as shown in FIGS. 1 and 5.

The visor may be worn in conjunction with an aviator's helmet 30 or even without such special headgear. In this respect, various means may be employed to secure the visor in place. In the case of a typical military pilot's helmet 30, it is known to provide hand manipulable means, in the form of a screw knob 32 engageable with the visor top edge 18 and which is respectively shifted fore and aft to displace the visor between use and non-use positions. Alternatively, and with or without a helmet, flexible attachment means in the form of removable adjustable straps 36,36, may be attached to each visor side edge 22. Obviously, such straps may be used to wear the visor 10 without a helmet by passing them around the head.

The present visor 10 is provided with visual enhancement means enabling a user, who either requires or would benefit from remedial optics, to clearly view cockpit panel instruments and printed or graphic material 34 located at a close range. Most particularly, such printed material 34 as contained on a kneeboard 38 mounted atop the user's thigh 40 as shown in FIG. 5. These kneeboards are a well known aid to all pilots and provide means to readily support and display aeronautical charts and to record radio frequencies, headings, etc. as delivered by air traffic control. This vital information is thereby always presented in a fixed planar manner as the kneeboard 38 is affixed to the thigh by a strap 42 and the material 34 to be displayed is retained by means of a releasable clamp 44 on the kneeboard.

Figure 3:
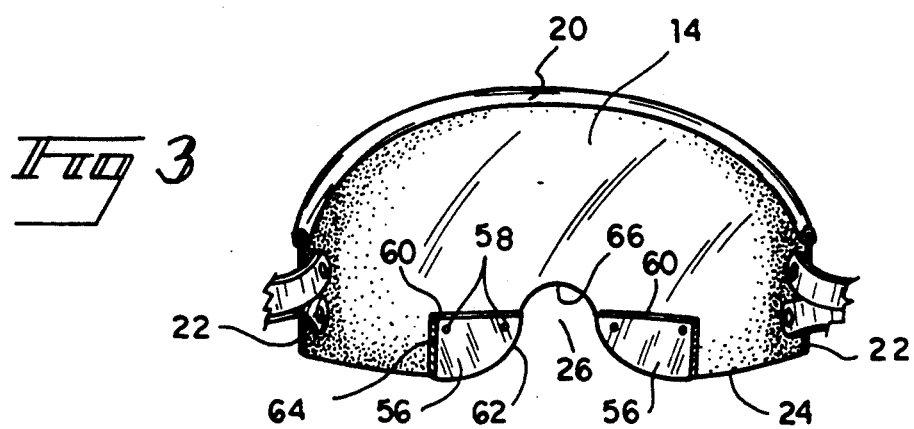
FIG. 3 is a rear elevation of the visor of FIG. 2.

The required close proximity of the material 34 may be outside the visual acuity range of some users and it is by the present invention that such a condition is overcome. With reference to FIG. 5, it will be seen that as a pilot 46 wearing the visor 10 maintains a heads-up attitude, scanning outside the cockpit is achieved along the straight-ahead axis 48 and observation of the aircraft instrument panel 50 is accomplished by dropping the eyes to an inclined axis 52. This latter axis may include an angle of 20-45 degrees below the horizontal and the distance of the various instruments from the pilot's eyes 54 may be sufficient to enable some farsighted persons to clearly read them, with uncorrected vision. On the other hand, in order to clearly discern the material 34 as contained on the closeup kneeboard 38 or side panel instruments as in military aircraft, corrective lenses are called for. With the present visor 10, a pair of corrective lenses 56,56 are affixed to the inner surface 14 of the visor and immediately adjacent the nose cut-out area 26. In order to minimize any occlusion throughout the span of these lenses, the attachment is preferably made by means of a pair of double-headed pins 58 located juxtaposed the top edge 60 of the lenses, respectively adjacent the inner lens edge 62 and outer lens edge 64. As will be seen most clearly in FIG. 3, the inner lens edge 62 is contiguous with the nose bridge cut-out 26 and defines a smooth curved edge flush with the visor bottom edge 24.

With the horizontal top edge 60 of the lenses 56 disposed at a plane lower than the zenith 66 of the visor nose bridge cut-out, it will be appreciated that during normal viewing of the aircraft instrument panel 50 as well as through the windshield 68, the pilot's line of sight will always pass through the visor at levels above the corrective lenses 56,56. On the other hand, when the need arises to view the contents of the material 34 upon the kneeboard 38, the pilot merely drops his or her line of sight to the steep angle represented as sight line 70 and this line will be understood to pass through the lenses 56,56. In this manner, visual acuity is provided for reading the kneeboard material 34 while the pilot maintains the heads-up attitude as in FIG. 5. The bulbous compound contour of the visor, wherein the lower area thereof curves downwardly and inwardly to the wearer's cheeks, results in the similarly contoured lenses 56,56 having their top edges 60 slightly tilted forwardly. This assists in orienting the lenses towards alignment with the sight line 70. As the intent of the lenses 56,56 is to provide for corrected vision at close range and along a user's line of sight as directed steeply downward toward their thigh when seated, the width of these lenses need not exceed 35 mm when measured by the length of the top edge 60.

Preferably, for daytime flying, the visor is tinted by any appropriate coating process as is well known in the art. To protect the outer surface 16 of the visor when it is removed and not being used, a removable cover 72 of suitable flexible, soft material may be affixed to the outer surface 16 by providing separable fastener components 74 and 76, respectively on the visor and cover. As shown in FIG. 6, the cover end edges 78 include the first fastener component 76 while the mating second fastener component 74 is carried by the outer surface of the visor, adjacent its side edges 22,22. Suitable fasteners may comprise hook and loop elements such as available under the trademark VELCRO.

From the foregoing description it will be appreciated that an improved pilot's visor is presented that readily allows the user to maintain a heads-up attitude and wherein a clear line of sight through the windshield and across the aircraft panel is available. The above is possible while also, corrective lenses attached to the visor along its bottom edge and adjacent the nose bridge cut-out, provide visual acuity when the user's line of sight is dropped to view the contents as carried by a kneeboard.

It is to be understood that the present invention is not limited to the sole embodiment described above, but encompasses any and all embodiments within the scope of the following claims.

I claim:

1. A visor for use by a pilot while maintaining a head's up attitude including;
   a body enabling the passage of light rays and defining a compound curved bulbous configuration having an outer surface forming a convex curvature along both vertical and horizontal axes,
   said body having top, bottom and side edges, said bottom edge including a medial nose bridge cut-out,
   said body including an inner surface,
   a pair of corrective lenses attached to said body inner surface, said corrective lenses each having an inner edge substantially flush with said nose bridge cut-out and body bottom edge, and
   means engageable with said body to retain said body in a use position over eyes of a user, whereby
   said user may view in a generally forward direction along a line of sight through said body without interference with said corrective lenses but when dropping said line of sight to a steeply inclined angle to view printed and graphical material in close proximity to said user, said line of sight passes through said pair of corrective lenses to benefit from the correction offered thereby without departing from the head's up attitude.

2. A visor according to claim 1 wherein, said body is tinted.

3. A visor according to claim 1 wherein, said body bottom edge is substantially flushly engageable with the fleshy portion of a user's face above their cheek bones.

4. A visor according to claim 1 wherein, said corrective lenses define a configuration comprising a compound curvature substantially flushly juxtaposed said body inner surface.

5. A visor according to claim 1 wherein, said body nose bridge cut-out terminates in an uppermost zenith,
   said corrective lenses including a substantially horizontal top edge, and
   said lens top edges disposed in a plane substantially below said nose bridge cut-out zenith.

6. A visor according to claim 1 wherein, said engageable means includes straps removably attachable to said body adjacent said body side edges.

7. A visor according to claim 1 wherein, said corrective lenses include a substantially vertical outer edge,
   a substantially horizontal top edge on said corrective lenses extending from said vertical edge to said body nose bridge cut-out, and
   said horizontal top edge defining a length no greater than 35 mm.

8. A visor according to claim 1 including, a cushion element on said body top edge.

9. A visor according to claim 1 including, fastener means retaining said corrective lenses attached to said body inner surface, and
   said fastener means including elongated elements passing through said corrective lenses and body.

10. A visor according to claim 1 including, fastener components on said body adjacent each said body side edge, and
    a protective cover having mating fastener components removably engageable with said fastener components on said body.

11. A visor according to claim 9 wherein, said fastener means includes double-headed pins.

12. A visor according to claim 10 wherein, said fastener components and mating fastener components include hook and loop elements.

13. A visor according to claim 1, said means engageable with said body to retain said body in a use position over eyes of a user comprises a screw knob mounted on a helmet and engageable with said top edge of said body and shiftable fore and aft to displace the visor between use and non-use positions.

14. A visor for use by a pilot, comprising:
    a body enabling the passage of light rays and defining a compound curved bulbous configuration having an outer surface forming a convex curvature along both vertical and horizontal axes,
    said body having top, bottom and side edges, said bottom edge including a medial nose bridge cut-out,
    said body including an inner surface,
    a pair of corrective lenses attached to said body inner surface substantially below a horizontal line of sight so as to not interfere with said horizontal line of sight, said pair of corrective lenses being attached to said body inner surface by fastener means formed of double-headed pins which pass through said corrective lenses and body,
    said corrective lenses each having an inner edge substantially flush with said nose bridge cut-out and body edge, and a horizontal top edge disposed in a plane lower than a zenith portion of said nose bridge cut-out, and
    means engageable with said body to retain said body in a use portion over eyes of a user, whereby
    said user may view distant objects along said horizontal line of sight and closer objects on an instrument panel located on a line of sight including an angle up to 45 degrees below said horizontal line of sight without interference with said pair of corrective lenses, and may view still closer objects including printed and graphic material contained on a kneeboard mounted on a thigh of said user by using a line of sight through said pair of corrective lenses to benefit from the correction offered thereby.

15. A visor according to claim 14, wherein said engageable means includes straps removably attachable to said body adjacent said body edges.

16. A visor according to claim 14, wherein, said engageable means includes a screw knob mounted on a helmet and engageable with said top edge of said body and shiftable fore and aft to displace the visor between use and non-use positions.

17. A visor according to claim 14, further comprising:
a removable protective cover of suitable flexible, soft material affixable to said outer surface of said body to protect said outer surface when said visor is not being used;
and fastening means for affixing said removable cover to said outer surface of said body.

18. A visor according to claim 17, said fastening means comprising hook and loop elements.

19. A visor according to claim 14, said body being tinted.

* * * * *